US012146638B2

(12) United States Patent
Gu

(10) Patent No.: US 12,146,638 B2
(45) Date of Patent: Nov. 19, 2024

(54) LIGHTING LAMP

(71) Applicant: APUTURE IMAGING INDUSTRIES CO., LTD., Guangdong (CN)

(72) Inventor: Haijun Gu, Guangdong (CN)

(73) Assignee: APUTURE IMAGING INDUSTRIES CO., LTD., Guangdong (CN)

( * ) Notice: Subject to any disclaimer, the term of this patent is extended or adjusted under 35 U.S.C. 154(b) by 164 days.

(21) Appl. No.: 17/887,581

(22) Filed: Aug. 15, 2022

(65) Prior Publication Data

US 2023/0113794 A1 Apr. 13, 2023

(30) Foreign Application Priority Data

Dec. 6, 2021 (CN) ......................... 202111478037.1

(51) Int. Cl.
*F21V 15/01* (2006.01)
*F21V 29/507* (2015.01)
*F21V 29/67* (2015.01)
*F21V 29/76* (2015.01)

(52) U.S. Cl.
CPC ............ *F21V 15/01* (2013.01); *F21V 29/507* (2015.01); *F21V 29/67* (2015.01); *F21V 29/76* (2015.01)

(58) Field of Classification Search
CPC ...... F21V 15/01; F21V 15/013; F21V 15/015; F21V 29/507
See application file for complete search history.

(56) References Cited

U.S. PATENT DOCUMENTS

| | | | | |
|---|---|---|---|---|
| 11,071,230 B2 | 7/2021 | Takaki et al. | | |
| 11,175,029 B1 | 11/2021 | Zhang et al. | | |
| 2013/0229807 A1* | 9/2013 | Huang | .................... | F21S 8/086 362/296.07 |

(Continued)

FOREIGN PATENT DOCUMENTS

| | | |
|---|---|---|
| CN | 103836393 A | 6/2014 |
| CN | 207132288 U | 3/2018 |
| CN | 209657059 U | 11/2019 |

(Continued)

OTHER PUBLICATIONS

The First Office Action and Search Report Dated Jan. 13, 2022, for Aputure Imaging Industries Co., Ltd., from China Application No. 202111478037.1 and Its Translation of Office Action Into English (9 pages).

*Primary Examiner* — Sean P Gramling
(74) *Attorney, Agent, or Firm* — Rivka Friedman

(57) ABSTRACT

An embodiment of the present application provides a lighting lamp comprising: a first housing, extending in a first direction and provided with a first fixing part, wherein, the first fixing part extends along the first direction; a second housing, provided at an end of the first housing along the first direction, wherein, the second housing is provided with a second fixing part, and the second fixing part extends along a thickness direction of the second housing; and at least one connecting component, comprising at least one first connecting part provided in close to the first housing and at least one second connecting part provided in close to the second housing, wherein, the at least one first connecting part and the first fixing part are fixedly connected, and the at least one second connecting part and the second fixing part are fixedly connected.

20 Claims, 8 Drawing Sheets

(56) References Cited

U.S. PATENT DOCUMENTS

| | | | |
|---|---|---|---|
| 2018/0017245 | A1 | 1/2018 | Wang et al. |

FOREIGN PATENT DOCUMENTS

| | | | |
|---|---|---|---|
| CN | 211502460 | U | 9/2020 |
| CN | 211853588 | U | 11/2020 |
| CN | 112243334 | A | 1/2021 |
| CN | 213040403 | U | 4/2021 |
| WO | 2021212764 | A1 | 10/2021 |

* cited by examiner

LIGHTING LAMP

CROSS-REFERENCE TO RELATED APPLICATION

The present application claims priority to Chinese patent application No. 202111478037.1, titled "LIGHTING LAMP", filed on Dec. 6, 2021, the entire contents of which are incorporated herein by reference.

FIELD OF INVENTION

The present application relates to a technical field of lighting technology, in particular to a lighting lamp.

BACKGROUND OF INVENTION

A film and television lamp is a lighting device used in film and television shooting, and can light shooted objects. The film and television lamp has high requirement for luminous power and heat dissipation performance, so that a number of internal components and an overall weight of the film and television lamp increase significantly, which has a great influence on internal layout and housing structure of the film and television lamp. In prior art, the housing structure of the film and television lamp has disadvantages of high difficulty in production and assembly and low connection reliability.

SUMMARY OF INVENTION

The embodiments of the present application provide a lighting lamp, which can reduce production and assembly difficulty as well as improve connection reliability of a housing structure.

In the first aspect, an embodiment of the present application provides a lighting lamp, comprising: a first housing, extending in a first direction and provided with a first fixing part, wherein, the first fixing part extends along the first direction; a second housing, provided at an end of the first housing along the first direction, wherein, the second housing is provided with a second fixing part, and the second fixing part extends along a thickness direction of the second housing; and at least one connecting component (30), comprising at least one first connecting part provided in close to the first housing and at least one second connecting part provided in close to the second housing, wherein, the at least one first connecting part and the first fixing part are fixedly connected, and the at least one second connecting part and the second fixing part are fixedly connected.

In some embodiments, the second housing comprises a body wall, the second fixing part is provided on the body wall, the body wall is provided on an end of the first housing along the first direction, an angle between a thickness direction of the body wall and the first direction is a sharp angle, and the second fixing part extends along the thickness direction of the body wall.

In some embodiments, the at least one first connecting part is one first connecting part, the second connecting part is one second connecting part, the one first connecting part and the one second connecting part are provided in pairs and adjacent to each other.

In some embodiments, the at least one first connecting part is a plurality of first connecting parts, the second connecting part is a plurality of second connecting parts, the plurality of first connecting parts are provided at two opposite ends of the connecting component, and the plurality of second connecting parts are respectively provided at two opposite ends of the connecting component.

In some embodiments, the at least one connecting component comprises a body part and first bending parts integrally connected; the at least one first connecting part is provided on the body part and extends along a thickness direction of the body part, and the thickness direction of the body part is parallel to the first direction; each of the first bending parts and the body wall are provided in parallel, and the at least one second connecting part is provided on at least one of the first bending parts and extends along a thickness direction of the at least one of first bending part.

In some embodiments, the first bending parts are provided at two opposite ends of the body part along an extending direction of the body part, and each of the first bending parts is provided with the at least one second connecting part.

In some embodiments, the first housing is further provided with a third fixing part, and an angle between an extending direction of the third fixing part and the first direction is greater than 0° and less than 180°, and the at least one connecting component is provided with a third connecting part, and the third connecting part and the third fixing part are fixedly connected.

In some embodiments, the at least one connecting component comprises a body part and a second bending part integrally connected; the at least one first connecting part is provided on the body part, and a thickness direction of the body part is parallel to the first direction; and the second bending part is parallel to a plane where the third fixing part is located in, and the third connecting part is provided on the second bending part and extends along a thickness direction of the second bending part.

In some embodiments, an angle between extending directions of any two of the at least one first connecting part, the at least one second connecting part and the third connecting part is greater than 0° and less than 180°.

In some embodiments, the first housing comprises a supporting plate and two side housings provided at two opposite ends of the supporting plate, the two side housings butt with the second housing along the first direction, and the two side housings are provided with the first fixing part and the third fixing part.

In some embodiments, the at least one connecting component is a plurality of connecting components, and each of the two side housings is fixedly connected with the second housing through one of the plurality of connecting components.

In some embodiments, the lighting lamp further comprises: a third housing, wherein, the third housing and the second housing are provided at two opposite ends of the first housing along the first direction, and a plane where the third housing is located in is vertical to the first direction; a fourth housing, wherein, the fourth housing is provided in opposition to and in connection with the first housing, and the fourth housing is connected with the second housing and the third housing; wherein, the first housing, the second housing, the third housing and the fourth housing encloses to form a hollow cavity; a radiator module, provided in an end of the hollow cavity in close to the second housing; and a light source, provided in an end of the hollow cavity in close to the third housing.

In some embodiments, wherein, the second housing comprises an end housing and an end cover, the end housing respectively butts with the first housing and the fourth housing, the body wall is formed on the end housing, a central area of the body wall is uplifted in a direction closed to the fourth housing to form a uplift part, and a first ventilation hole is provided on a surface of the uplift part in face to the fourth housing; the end cover is provided at a connection of the uplift part and the body wall, and the end cover is provided with a plurality of second ventilation holes.

In some embodiments, the fourth housing is provided with a plurality of third ventilation holes, the plurality of third ventilation holes are arranged along the first direction, the first ventilation hole is provided in face to the third ventilation holes, the second ventilation holes are provided in face to the first ventilation hole, the second ventilation holes, the first ventilation hole, and a third ventilation hole of the fourth housing in close to an end of the second housing among the third ventilation holes are connected.

In some embodiments, the lighting lamp further comprises a cooling fan, the cooling fan is provided in the uplift part, and the uplift part is embedded in the radiator module.

In some embodiments, an installation groove is provided on a side surface of the radiator module in close to the second housing, the uplift part is embedded in the installation groove, and shapes of the installation groove and the uplift part are matched.

In some embodiments, a side wall of the first housing opposite to the fourth housing is provided with a fourth ventilation hole connected with a third ventilation hole among the third ventilation hole, and the fourth ventilation hole is provided in face to the third ventilation hole.

In some embodiments, a plurality of cooling fins are provided on a side surface of the radiator module in close to the second housing.

In some embodiments, the radiator module includes a main radiator, a secondary radiator, a first fixing plate and a second fixing plate, the first fixing plate extends along the first direction, the main radiator is connected to the first housing through the first fixing plate, the second fixing plate extends along a vertical direction of the first direction, the secondary radiator, and the second fixing plate and the main radiator are fixedly connected in turn along the first direction.

In some embodiments, a third fixing plate is provided around a side of the main radiator in face to the third housing, a fourth fixing part is provided at the third housing, and the third fixing plate and the fourth fixing part are fixedly connected.

In some embodiments, the second housing is provided with a fifth fixing part extending toward the fourth housing, the fourth housing is provided with a sixth fixing part extending toward the second housing, and the fifth fixing part and the sixth fixing part are fixedly connected.

An embodiment of the present application provides a connecting component between the first housing and the second housing, and connects the first housing and the second housing through the connecting component; on the one hand, the first housing and the second housing can be connected and tightened through the connecting component after butting, and since there is no need for direct tightening between the first housing and the second housing, the first fixing part on the first housing can be configured to extend along the first direction, in order to make the first fixing part and mold outlet direction of the first housing consistent, while the second fixing part on the second housing can extend along the thickness direction of the second housing, in order to make the second fixing part and mold outlet direction of the second housing consistent, so that there will be no inverted buckle mechanism at the first fixing part or the second fixing part, and though the first housing and the second housing are easy to demould during manufacturing, there is still no need to provide demoulding mechanism, while the first housing and the second housing can also be more conveniently aligned during assembly, thus reducing difficulty and cost of production manufacturing and assembly process; on the other hand, without increasing difficulty of demoulding, a required number of first fixing parts and second fixing parts are provided according to requirement of bearing strength and structural layout, so as to overcome trend of connection structure separation and risk of fatigue failure caused by gravity and tilting moment of devices provided in adjacent area, and enhance carrying capacity of the second housing for devices provided in adjacent area.

DESCRIPTION OF DRAWINGS

In order to more clearly illustrate technical solutions in embodiments of the present application, accompanying drawings required to be used in description of the embodiments will be briefly introduced as follows. It is obvious that drawings in the following description merely illustrate part of embodiments of the present application. For those skilled in the art, other drawings can be obtained based on the drawings without creative efforts.

DETAILED DESCRIPTION OF PREFERRED EMBODIMENTS

Figure 1:
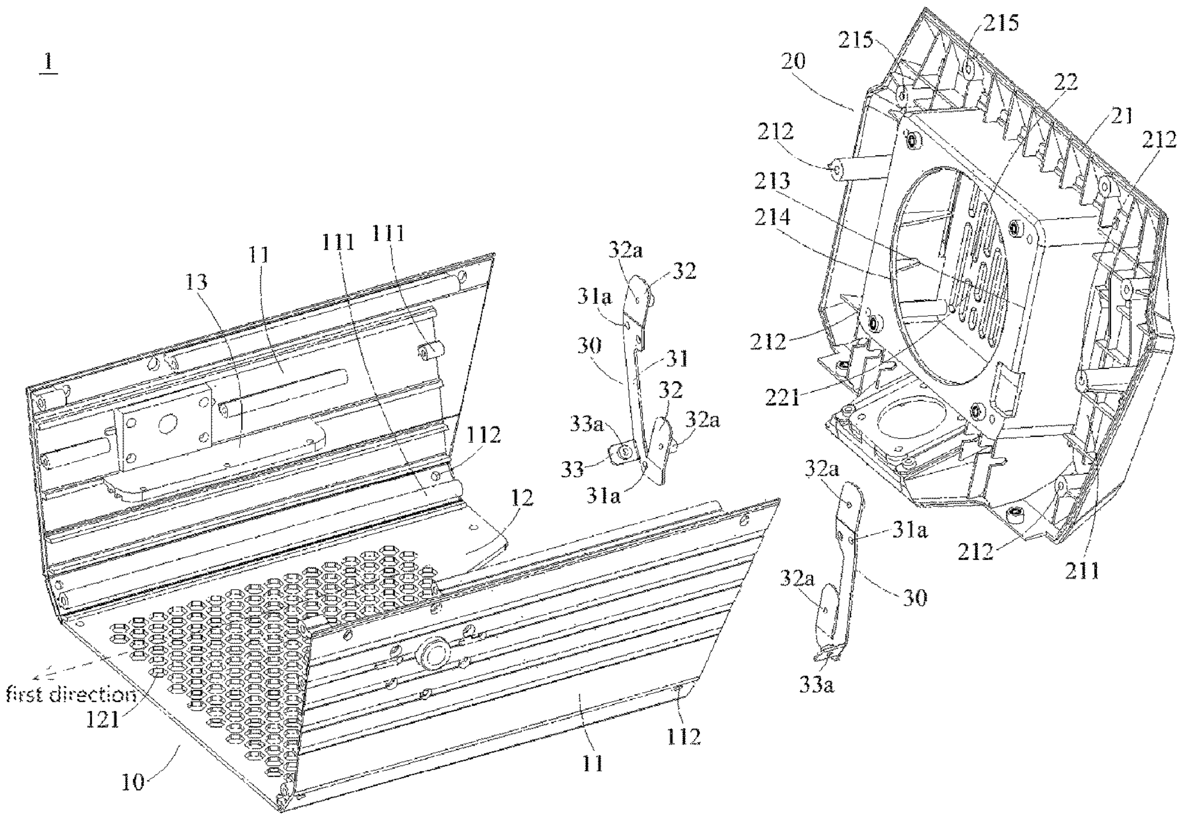
FIG. 1 is a partial exploded structure diagram of a lighting lamp provided by some embodiments of the present application.

Technical solutions according to the present application will be clearly and completely described below in conjunction with the drawings in the embodiments of the present application. It is obvious that, described embodiments are part of the embodiments of the present application, rather than all of the embodiments. Based on the embodiments in the present application, all other embodiments obtained by those of ordinary skill in the art without creative work are within scope of protection of the present application.

In the description of the present application, it should be understood that orientations or position relationships indicated by terms such as “center”, “longitudinal”, “lateral”, “length”, “width”, “thickness”, “upper”, “lower”, “front”, “rear”, “left”, “right”, “vertical”, “horizontal”, “top”, “bottom”, “inner”, “outer”, and the like are based on orientation or position shown by the accompanying figures. They are only for convenience of describing the present application and simplifying the description, rather than indicating or implying that a device or element being referred to must have a particular orientation or position, or be constructed or operated in a particular orientation or position, and thus should not be construed as limiting the present application. Furthermore, terms "first", "second" are used for purpose of describing only and are not to be construed as indicating or implying relative importance or implicitly indicating a number of technical features indicated. Thus, features defined as "first", "second", may explicitly or implicitly include one or more of the described features. In the description of the present application, "a plurality of" or "multiple" means two or more unless otherwise specifically defined.

"A and/or B" includes following three combinations: only A, only B, and combination of A and B.

Use of "applicable" or "configured" in this present application means an open and inclusive language. It does not exclude a device that is applicable or configured to perform additional tasks or steps. In addition, use of "based" means openness and inclusiveness, as processes, steps, calculation, or other actions "based" on one or more mentioned conditions or values may in practice be based on additional conditions or exceed the mentioned values.

In the present application, a term "exemplary" is used to represent "serving as an embodiment, illustration or description." Any embodiment described as "exemplary" in the present application is not necessarily construed to be more preferable or more advantageous than other embodiments. In order to enable any person skilled in the art to implement and use the present application, following description is given. In the following description, details are listed for purpose of explanation. It should be understood that, those of ordinary skill in the art will realize that, the present application can also be implemented without using these specific details. In other embodiments, well-known structures and processes will not be described in detail to avoid unnecessary details to obscure the description of the present application. Therefore, the present application is not intended to be limited to the embodiments shown, but is to be accorded the widest scope consistent with principles and features disclosed in the present application.

In prior art, since the film and television lamp has higher requirements for luminous power and heat dissipation performance, it is necessary to provide a larger number of light source devices with larger power, and provide radiators and heat dissipation fans which can meet corresponding heat dissipation requirements. In this way, a number of internal devices and overall weight of the film and television lamp are significantly increased, so that internal layout and housing structure of the film and television lamp need to be changed accordingly. At some areas of the housing structure of the film and television lamp, such as a rear side wall provided along a light outlet direction and in face to a light outlet part, irregular inclined surface will appear to form an inclined side wall. In one aspect, there is an obtuse intersection angle between the inclined side wall and its adjacent side wall (hereinafter referred to as an adjacent side wall), the inclined side wall is usually directly connected to the adjacent side wall, and a fixing part is provided respectively on the inclined side wall and the adjacent side wall to realize connection of the inclined side wall and the adjacent side wall. since an angle between the inclined side wall and the adjacent side wall is an obtuse angle rather than a right angle, the fixing part on one of the inclined side wall and the adjacent side wall needs to be configured to be consistent with a demoulding direction of a side wall connected to the fixing part, and has a sharp intersection angle with a demoulding direction of the side wall where the fixing part is located in. In this way, the fixing part forms an inverted buckle mechanism on the side wall where the fixing part is located in, it is difficult to demould unless providing a complex demoulding mechanism for demoulding, and it is difficult to align during assembly, thus increasing difficulty and cost of manufacturing and assembly process. In another aspect, due to obtuse angle between the inclined side wall and the adjacent side wall, gravity of devices provided in the adjacent area acts on the inclined side wall and produces tilting moment at a connecting part of the inclined side wall and the adjacent side wall, causing separation trend and fatigue failure risk of the connecting part between the inclined side wall and the adjacent side wall, and thus reducing connection reliability between the inclined side wall and the adjacent side wall; connection strength between the inclined side wall and the adjacent side wall is required to be increased, so that a plurality of the fixing parts need to be provided on the inclined side wall and the adjacent side wall to form multi-point connection, in order that a number of the buckle mechanism is further increased, and difficulties of demoulding of the side wall and structural complexity of the demoulding mechanism are increased, and difficulties and cost of manufacturing and assembly process are further increased.

Figure 2:
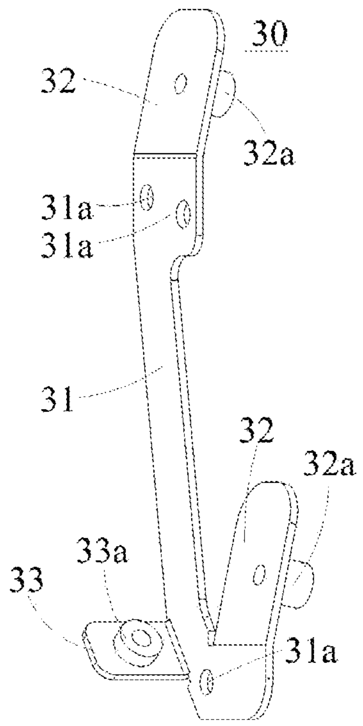
FIG. 2 is an axial structure diagram of a connecting component of a lighting lamp provided by some embodiments of the present application.
Figure 3:
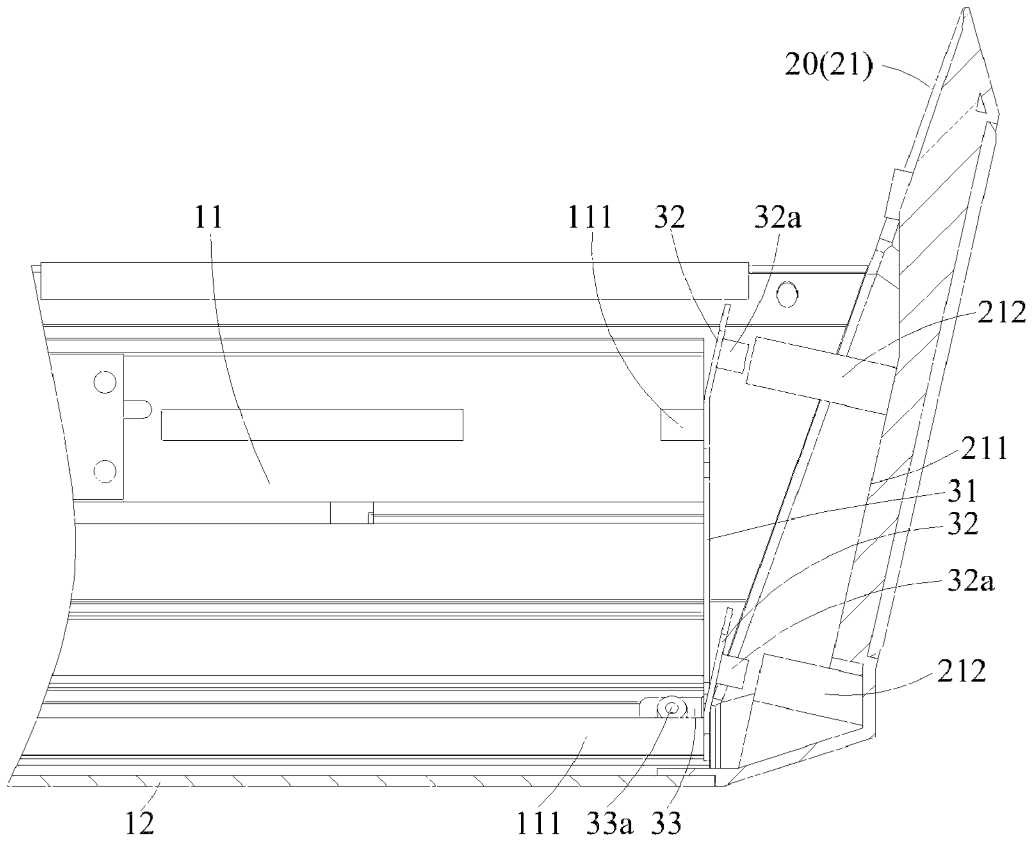
FIG. 3 is an local profile structure diagram of a lighting lamp provided by some embodiments of the present application.
Figure 4:
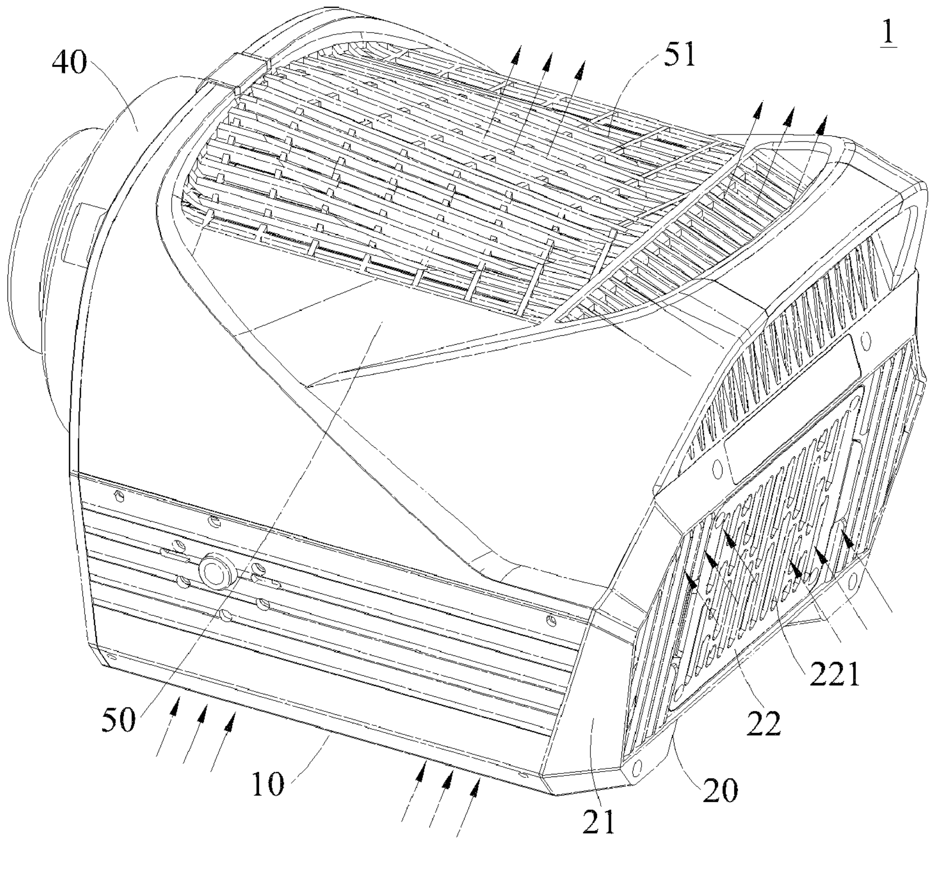
FIG. 4 is an axial structure diagram of a lighting lamp provided by some embodiments of the present application.
Figure 5:
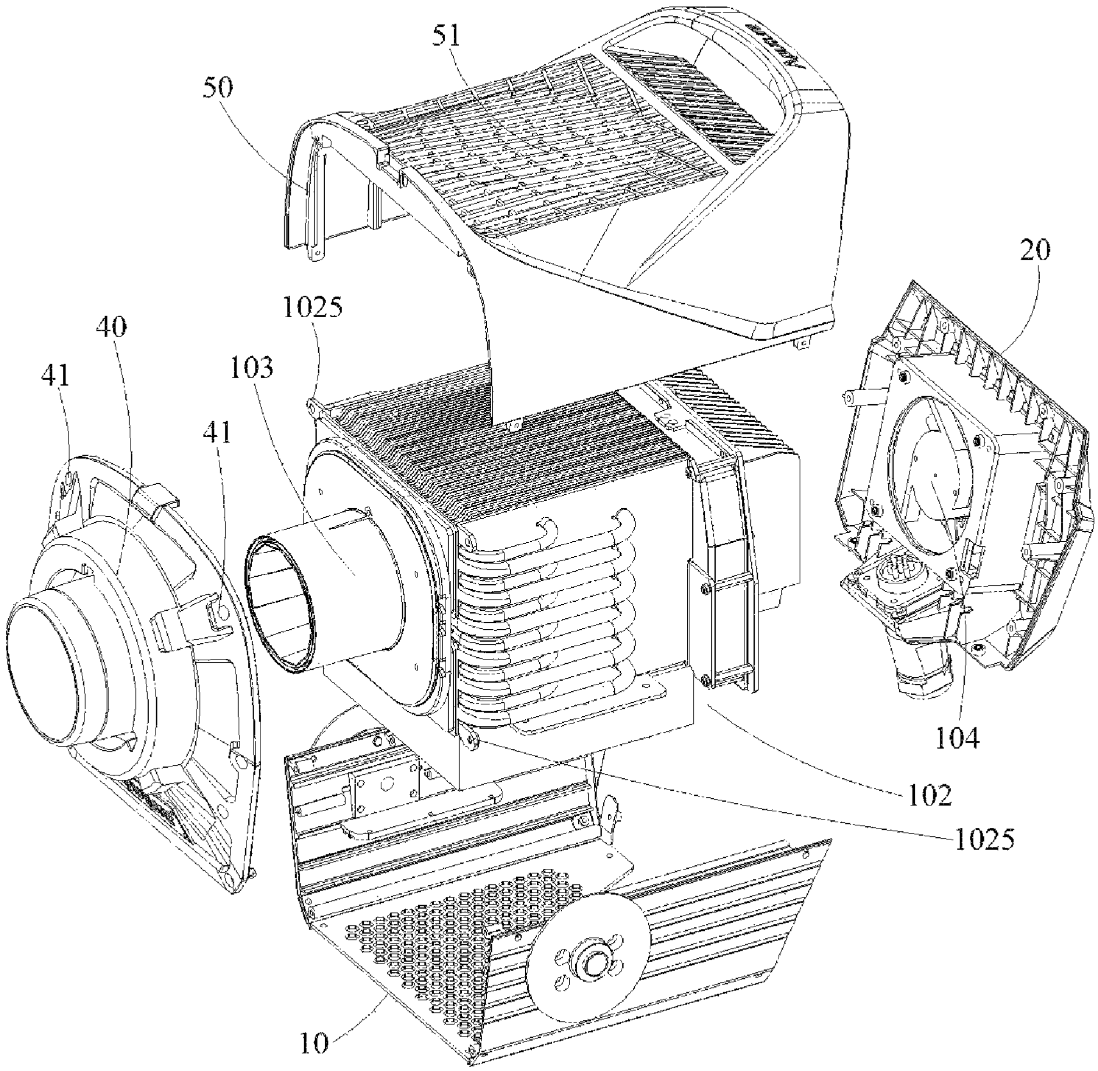
FIG. 5 is an exploded structure diagram of a lighting lamp provided by some embodiments of the present application.

As shown in FIGS. 1-3, embodiments of the present application provides a lighting lamp 1, which includes a first housing 10, a second housing 20 and at least one connecting component 30, thus reducing difficulty of production and assembly of the housing structure and improving reliability of connection.

The first housing 10 extends in a first direction and provided with a first fixing part 111, and the first fixing part 111 extends along the first direction. Here, a specific direction of the first direction can be determined according to actual needs, and the embodiments of the present application do not make limitation on it. In some embodiments, the first housing 10 can be an injection molded part, and the first direction can be a mold outlet direction of the first housing 10. In this way, the first housing 10 wholy extends along its mold outlet direction, and thus can be easily demoulded from a mould, reducing manufacturing difficulty of the first housing 10. For example, the first direction can be a horizontal direction, and the first housing 10 can extend along the horizontal direction.

The second housing 20 includes a body wall 211 and a second fixing part 212 provided on the body wall 211. The body wall 211 is provided on an end of the first housing 10 along the first direction, and an angle between a thickness direction of the body wall 211 and the first direction is a sharp angle. The second fixing part 212 extends along the thickness direction of the body wall 211 in order to make mold outlet direction of the second fixing part 212 and outlet direction of the body wall 211 consistent. The body wall 211 and the second fixing part 212 both can be moulded at once in order to reduce manufacturing difficulty of the second housing 20. Since the first fixing part 111 extends along the first direction, there is a sharp angle rather a vertical angle between an extending direction of the first fixing part 111 and an extending direction of the second fixing part 212.

The at least one connecting component 30 includes at least one first connecting part 31*a* and at least one second connecting part 32*a*. The at least one first connecting part 31*a* is provided in close to the first housing 10, and the at least one second connecting part 32*a* is provided in close to the second housing 20. The at least one first connecting part 31*a* and the first fixing part 111 are fixedly connected. The at least one second connecting part 32*a* is a plurality of second connecting parts 32*a*, and a number of the plurality of second connecting parts 32*a* and a number of second fixing parts 212 are same, and the plurality of second connecting parts 32*a* are fixedly connected to the second fixing parts 212 in one-to-one correspondence. Through connection between the at least one first connecting part 31*a* and the first fixing part 111, the at least one connecting component 30 can be connected with the first housing 10. And through connection between the at least one second connecting part 32*a* and the second fixing part 212, the at least one connecting component 30 can be connected with the second housing 20. In this way, the first housing 10 and the second housing 20 can be fixedly connected through the at least one connecting component 30.

In comparison with prior art, the lighting lamp 1 provided in an embodiment of the present application is provided with the at least one connecting component 30 between the first housing 10 and the second housing 20. In one aspect, the first housing 10 and the second housing 20 can be fixedly connected through the at least one connecting component 30 after butting with each other. Thus the first housing 10 and the second housing 20 do not need to be directly fixedly connected with each other. The first fixing part 111 on the first housing 10 can be configured to extend along the first direction, in order to make mold outlet direction of the first fixing part 111 and mold outlet direction of the first housing 10 consistent, while the second fixing part 212 on the second housing 20 can extend along the thickness direction of the second housing 20, in order to make mold outlet directions of the second fixing part 212 and mold outlet directions of the body wall 211 consistent, so that there will be no inverted buckle mechanism at the first fixing part 111 and the second fixing part 212, and though the first housing 10 and the second housing 20 are easy to demould during manufacturing, there is no need to provide demoulding mechanism, and the first housing 10 and the second housing 20 can also be more conveniently aligned during assembly, reducing difficulty and cost of production manufacturing and assembly process; In another aspect, without increasing difficulty of demoulding, a required number of first fixing parts 111 and second fixing parts 212 can be provided according to requirement of bearing strength and structural layout, so as to overcome connected structure's separation trends caused by gravity and tilting moment of adjacent devices and risk of fatigue failure, and enhance carrying capacity of the second housing 20 for devices provided in the adjacent area.

The first housing 10 and the second housing 20 can be made by different molding processes, and can be made by process types such as an injection molding process and a casting process, etc. And embodiments of the present application do not make limitation on it. In some embodiments, the first housing 10 and the second housing 20 can be injection molded elements made by injection molding process, and are thus suitable for mass production.

In some embodiments, the first housing 10 is provided with the second fixing part 212. Herein, an angle between an extending direction of the third fixing part 112 and the first direction is greater than 0° and less than 180°. In some embodiments, the third fixing part 112 can extend along a vertical direction of the first direction. Accordingly, the at least one connecting component 30 includes the third connecting part 33*a*, and the third connecting part 33*a* and the third fixing part 112 are fixedly connected. Through connection between the at least one first connecting part 31*a* and the first fixing part 111, connection between the third connecting part 33*a* and the third fixing part 112, the first housing 10 and the at least one connecting part 30 can be fixedly connection in two directions, and thus the connecting part 30 can be supported in the two directions. The at least one connecting part 30 can be fixedly connected with the second housing 20 to support the second housing 20. In this way, the first housing 10, the at least one connecting component 30 and the second housing 20 form a multi-directional and multi-point connection fastening structure, thus increasing reliability of connection between the first housing 10 and the second housing 20 and providing structural support for the second housing 20.

Structure types of the first fixing part 111, the second fixing part 212 and the third fixing part 112 can be determined according to actual needs, and can be screw columns, convex column with countersunk head holes, and screw holes provided on a component body, etc. And the embodiments of the present application do not make limitation on it. In some embodiments, the first fixing part 111 can be a screw column provided on the first housing 10, the second fixing part 212 can be a convex column provided on the second housing 20, and the third fixing part 112 can be a screw hole or a through hole provided on the first housing 10. Herein, when the third fixing part 112 is a screw hole or a through hole, an extending direction of the third fixing part 112 is a depth direction of the screw hole or the through hole.

The at least one connecting component 30 can be made by different molding processes, and the embodiments of the present application do not make limitation on it. In some embodiments, the at least one connecting component 30 can be a sheet metal part that made by sheet metal process, and is easy to manufacture, reducing manufacturing difficulty.

Structural types of the at least one first connecting part 31*a*, the at least one second connecting part 32*a* and the third connecting part 33*a* can be determined according to the actual needs, and can be a welding nut/a nut column and a screw hole/a through hole provided on the at least one connecting part 30, etc. The embodiments of the present application do not make limitation it. In some embodiments, the first at least one connecting part 31*a* can be a through hole provided on the at least one connecting component 30, while the at least one second connecting part 32*a* and the third connecting part 33*a* can be a nut/a nut column welded on a surface of the at least one connecting component 30, in order to have advantages of easy production and reliable structure.

A number of the at least one first connection 31*a* can be provided according to requirement of structure, and can be one or more than one. The embodiments of the present application do not make limitation on it. Similarly, a number of the at least one second connection 32*a* can be provided according to requirement of structure, and can be one or more than one. The embodiments of the present application do not make limitation on it. When a number of the at least one second connecting part 32*a* is more than one, a number of second fixing parts 212 of the second housing 20 are also more than one correspondingly, so that connection between the at least one connecting component 30 and the second housing 20 is multi-point connection, thus increasing reliability of connection and capacity of bearing between the at least one connecting component 30 and the second housing 20. Similarly, a number of third connections 33*a* can be provided according to requirement of structure, and can be one or more. The embodiments of the present application do not make limitation on it.

The at least one first connecting part 31*a* and the at least one second connecting part 32*a* can be provided as required. In some embodiments, the at least one first connecting part 31*a* and the at least one second connecting part 32*a* provided in pair and adjacent to each other inside each pair. In other words, each first connecting parts 31*a* of the at least one first connecting part 31*a* is provided in pair with the one second connecting part 32*a* of the at least one second connecting part 32*a*, and a first connecting part 31*a* and a second connecting part 32*a* in each pair are neighboring to each other, so that a position of connected force applied by the at least one first connecting part 31*a* in the connecting component 30 is closed to that of the connected force applied by the at least one second connecting part 32*a* in the connecting component 30, avoiding deformation torque due to far distance.

In some embodiments, the at least one first connecting part 31*a* is a plurality of first connecting parts 31*a*, the at least one second connecting part 32*a* is a plurality of second connecting parts 32*a*, the plurality of first connecting parts 31*a* are respectively provided at two opposite ends of the connecting component 30, and the plurality of second connecting parts 32*a* are respectively provided at two opposite ends of the connecting component 30. In this way, two opposite ends of the at least one connecting component 30 are fixedly connected through the at least one first connecting part 31*a* and the first fixing part 111 of the first housing 10, respectively. It can make full use of a span of the connecting component 30 to make a plurality of connections on the first housing 10 to increase strength of connection and reliability. Similarly, two opposite ends of the at least one connecting component 30 are fixedly connected through the at least one second connecting part 32*a* and the second fixing part 212 of the second housing 20, respectively. It can make full use of a span of the at least one connecting component 30 to make a plurality of connections on the second housing 20, to increase strength of connection and reliability.

In some embodiments, an angle between extending directions of any two of the at least one first connecting part 31*a*, the at least one second connecting part 32*a* and the third connecting part 33*a* is greater than 0° and less than 180°, in order to make any two of them not parallel to each other. In this way, the at least one first connecting part 31*a*, the at least one second connecting part 32*a* and the third connecting part 33*a* extend in different directions respectively, can be connected with the first housing 10 body or the second housing 20 body accordingly in different directions to meet requirement of fixed connection in different angles, and can provide fixed connecting force in a plurality of directions to make structure of connection more reliable.

Structure of the at least one connecting component 30 can be determined according to actual needs, and the embodiments of the present application do not make limitation on it. In some embodiments, the at least one connecting component 30 can include a body part 31. Herein, the first connecting part 31*a* can be provided on the body part 31, so that the body part 31 can be connected with the first fixing part 111 of the first housing 10 in better lamination to obtain better structural support. Herein, a thickness direction of the body part 31 can be parallel to the first direction. In some embodiments, the at least one first connection 31*a* can be coaxially connected with the first fixed 111.

In some embodiments, the at least one connecting component 30 includes a body part 31 and first bending parts 32 integrally connected, and an angle between the body part 31 and each of the first bending parts 32 is greater than 0° and less than 180°, so that the body part 31 and the first bending parts 32 are not parallel to each other. For example, the first bending parts 32 can be provided on a side of the body part 31 in close to the second housing 20. The first bending parts 32 can be parallelly provided to the body wall 211, while the at least one second connecting part 32*a* can be provided on the first bending parts 32. In this way, there is no need to design special inverted buckle mechanism of the second fixing part 212, since the first bending parts 32 can be used to make the at least one second connecting part 32*a* and the second fixing part 212 coaxially connected with simple and reliable structure. In some embodiments, the at least one second connection 32*a* can be coaxially connected with the second fixed 212. A number and positions of the first bends 32 can be determined according to actual needs, and the embodiments of the present application do not make limitation on it. In some embodiments, the first bending parts 32 are respectively provided at two opposite ends of the body part 31 along an extending direction of the body part 31, and each of the first bending parts 32 is provided with one of the at least one second connecting part 32*a*. Herein, specific implementations of integrated connection can be determined according to actual needs, and are e.g. integrated molding, welding, etc. The embodiments of the present application do not make limitation on it.

In some embodiments, the at least one connecting component 30 can also include second bending parts 33 integrally connected with the body part 31, and an angle between the body part 31 and each of the second bending parts 33 is greater than 0° and less than 180°, so that the body part 31 and each of the second bending parts 33 are not parallel to each other. Exemplarily, the second bending parts 33 can be provided on a side of body part 31 in close to the first housing 10. Exemplarily, an angle between any one of the first bending parts 32 and any one of the second bending parts 33 is greater than 0° and less than 180°, so that any one of the first bending parts 32 and any one of the second bending parts 33 are not parallel to each other. One of the second bending parts 33 can be parallel to a plane where the third fixing part 112 is located in, and the third connecting part 33*a* can be provided on the second bending part 33. The plane where the third fixing part 112 is located in is a plane that the third fixing part 112 is attached to, which is vertical to extending direction of the third fixing part 112. In this way, it is not necessary to design special inverted buckle mechanism of the third fixing part 112, since the second bending parts 33 can be used to make the third connecting part 33*a* and the third fixing part 112 coaxially connected with simple and reliable structure. In some embodiments, the third connection 33*a* can be coaxially connected with the third fixing part 112. A number and positions of second bending parts 33 can be determined according to actual needs, and the embodiments of the present application do not make limitation on it. Herein, specific implementation of integrated connection can be determined according to actual needs, and is e.g. integrated molding, welding, etc. And the embodiments of the present application do not make limitation on it.

In some embodiments, the at least one connecting component 30 is provided with two first bending parts 32, the two first bending parts 32 are provided at two opposite ends of the body part 31, and each the first bending parts 32 is provided with one of the at least one second connecting part 32*a*, respectively. Exemplarily, the two first bending parts 32 can be provided oppositely along an extending direction of body part 31. In this way, on one aspect, the at least one connecting component 30 and the second housing 20 have multi-point connection relationship, thus increasing reliability of connection and bearing capacity between the at least one connecting component 30 and the second housing 20. On another aspect, a connecting part between the at least one connecting component 30 and the second housing 20 can be located at both ends of the body 31, so that the second housing 20 can be supported from an upper side and a lower side to increase structural reliability of the second housing 20.

Specific structure of the first housing 10 can be determined according to actual needs, and the embodiments of the present application do not make limitation on it. In some embodiments, the first housing 10 can include a supporting plate 12 and two side housings 11 provided at two opposite ends of the supporting plate 12. Herein, the supporting plate 12 can be provided at bottom of a product, in order to protect and support internal devices, side housings 11 and the second housing 20, etc. The side housings 11 can extend along the first direction and butt with the second housing 20 along the first direction, and the first fixing part 111 and the third fixing part 112 can be provided on the side housing 11. In this way, the side housings 11 can be fixedly connected through the connecting component 30 after butting with the second housing 20. In some embodiments, a lighting lamp 1 can include a plurality of connecting components 30. Each side housing 11 is fixed with the second housing 20 through the at least one connecting component 30. It can increase connected points of the lighting lamp 1 and enhance reliability and stability of connection. Exemplarily, the two side housing 11 can be provided symmetrically. Accordingly, two connecting components 30 can be provided symmetrically. For example, each connecting components 30 corresponds to one side housing 11, respectively.

In some embodiments, Array of a plurality of fourth ventilation holes 121 can be provided on the supporting plate 12. The fourth ventilation holes 121 can increase air flow between internal space and external environment of the lighting lamp 1, increasing heat dissipation capacity of the lighting lamp 1, and improving product performance.

As shown in FIGS. 1-4, the lighting lamp 1 also includes a third housing 40 and a fourth housing 50. Herein, the third housing 40 and the second housing 20 can be provided oppositely at two opposite ends of the first housing 10 along the first direction. A plane where the third housing 40 is located in can be vertical to the first direction, so that the third housing 40 can be directly connected with the first housing 10 without inverted buckle mechanism, reducing difficulty and cost of assembly. The fourth housing 50 and the first housing 10 are oppositely provided and connected with each other, and the fourth housing 50 connects the second housing 20 and the third housing 40. The first housing 10, the second housing 20, the third housing 40 and the fourth housing 50 enclose to form a hollow cavity. In other words, the first housing 10 and the fourth housing 50 can be connected to form an inner cavity with openings at both ends and the second housing 20 and the third housing 40 can be provided on the openings at both ends of the inner cavity for enclosing to form the hollow cavity used to accommodate functional devices such as light source devices, radiators and circuit boards. Since the first housing 10, the second housing 20, the third housing 40 and the fourth housing 50 all have mechanical structures which are easy to be manufactured, it is easy to assemble and connection structure is reliable when connecting the first housing 10, the second housing 20, the third housing 40 and the fourth housing 50, which can reduce difficulty of production and assembly of housing structure and improve reliability of connection.

In some embodiments, the second housing 20 can include an end housing 21 and an end cover 22. The end housing 21 respectively butts with the first housing 10 and the fourth housing 50, and the body wall 211 is formed on the end housing 21. A central area of the body wall 211 is uplifted in a direction closed to the fourth housing 50 to form a uplift part 213, and the end cover 22 is provided at junction of the uplift part 213 and the body wall 211. The end cover 22 and the uplift part 213 enclose to form an installation space that can accommodate a cooling fan 104. Herein, a first ventilation hole 214 is provided on a surface of the uplift part 213 in face to the fourth housing 50, and the end cover 22 is provided with a plurality of the second ventilation holes 221. In one aspect, above structure can realize installation of the cooling fan 104, while in another aspect, it can ensure that a side surface of the second housing 20 in face to the external environment is relatively smooth, so that the lighting lamp 1 has cleaner appearance and a more compact overall size.

In some embodiments, a plurality of third ventilating holes 51 are provided on the fourth housing 50 along the first direction. The first ventilating hole 214 is provided in face to the plurality of third ventilating holes 51, and the second ventilating hole 221 is provided in face to the first ventilating hole 214. The first ventilating hole 214, the second ventilating hole 221 and the third ventilating hole 51 among the plurality of third ventilating holes 51 of the fourth housing 50 in close to an end of the second housing 20 are connected. Since there is a blunt intersection angle between the second housing 20 and the first housing 10, when the first housing 10 is provided horizontally, the second housing 20 tilts upward in face to the fourth housing 50. In this way, the second ventilating hole 221, the first ventilating hole 214 and the third ventilating hole 51 form an inclined upward air flow channel. External cold air can enter the uplift part 213 through the second ventilating hole 221, then go through the first ventilating hole 214 to absorb heat that in the lighting lamp 1, and then leave the lighting lamp 1 through the third ventilating hole 51, so that heat is dissipated into external air environment, taking benefit of a principle of hot air rising to accelerate discharge of hot air in the lighting lamp 1, in order to achieve better air cooling loss effect.

In some embodiments, a side wall of the first housing 10 in face to the fourth housing 50 is provided with the fourth ventilation holes 121 connected to the third ventilation holes 51, and the fourth ventilation holes 121 are provided in face to the third ventilation holes 51. In this way, external cold air can enter the lighting lamp 1 through the fourth ventilation holes 121, and then absorb heat in the lighting lamp 1. After that, heat can be dispersed into external air environment by leaving the lighting lamp 1 through the third ventilation holes 51. Principle of hot air rising is taken advantage of to accelerate hot air in the lighting lamp 1 to discharge, so as to achieve better discharging cooling air effect.

As shown in FIGS. 1-5, the lighting lamp 1 also includes a radiator module 102 and a light source 103. It can be understood that a direction of the light source 103 in a figure is only exemplary. In fact, a light source 103 is in a cavity pointed in a figure, which can be known by those skilled in the art. The radiator module 102 is provided in an end of the hollow cavity in close to the second housing 20, to dissipate heat of heating devices including the light source 103 and a circuit board, etc. The light source 103 is provided in an end of the hollow cavity in close to the third housing 40, thus emitting ultraviolet light through the third housing 40 to achieve purpose of lighting.

In some embodiments, the lighting lamp 1 also includes a cooling fan 104, the cooling fan 104 is provided in the uplift part 213, and the uplift part 213 is provided in the radiator module 102. In this way, the cooling fan 104 can be used to realize forcing convection, thus increasing air flow velocity and air cooling efficiency.

Figure 6:
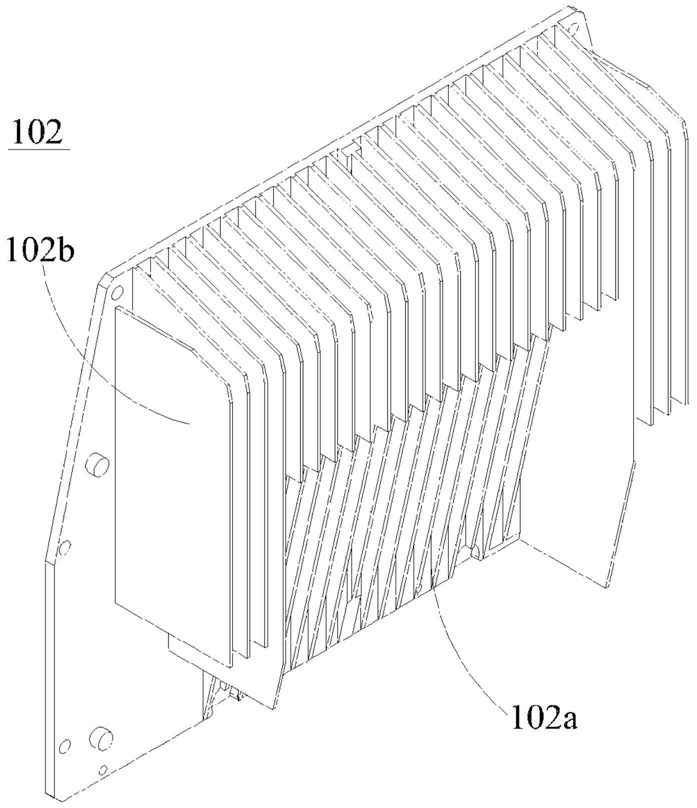
FIG. 6 is a local axial structure diagram of a radiator module for a lighting lamp provided by some embodiments of the present application.

As shown in FIG. 6, in some embodiments, a side surface of the radiator module 102 in close to the second housing 20 may be provided with an installation slot 102*a*. A bulge 213 is embedded in the installation slot 102*a*. Shape of the installation slot 102*a* and that of the bulge 213 are matched. In this way, the radiator module 102 and the second housing 20 can be assembled closely, so that the cooling fan 104 can be provided in close to the radiator module 102, taking advantage of forced convection of the cooling fan 104 to conduct air-cooled heat dissipation on the radiator module 102, so that heat on the radiator module 102 can be dissipated in time to ensure heat dissipating efficiency of the radiator module 102.

In some embodiments, a plurality of cooling fins 102*b* can be provided on a side surface of the radiator module 102 in close to the second housing 20. The cooling fins 102*b* can increase heat exchanging area of the radiator module 102, thus increasing heat dissipating efficiency.

Figure 7:
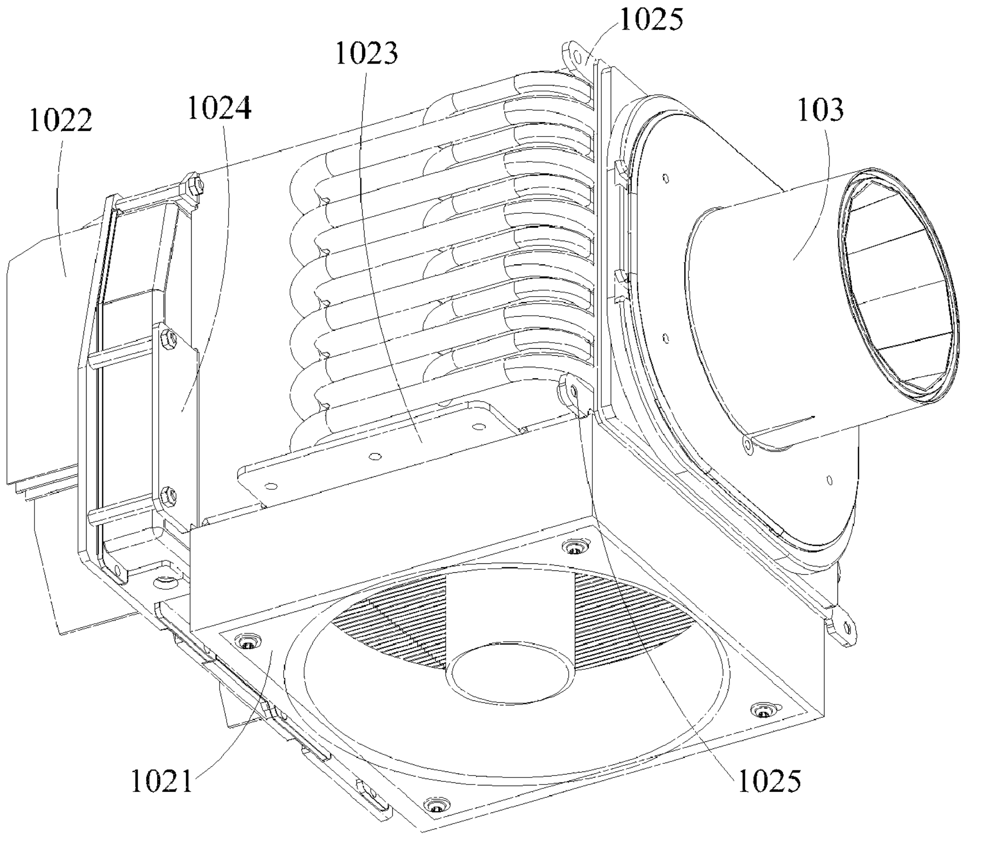
FIG. 7 is an axial structure diagram of a radiator module for a lighting lamp provided by some embodiments of the present application.

As shown in FIG. 7, in some embodiments, the radiator module 102 includes a main radiator 1021, a secondary radiator 1022, a first fixing plate 1023 and a second fixing plate 1024. The main radiator 1021 can be thermally connected with the light source 103, so that the light source 103 can be timely cooled to keep the light source 103 in a better temperature range and avoid overheating damage. It can be understood that the main radiator 1021 can also include a fan, which can be provided at a position of the first housing 10 in correspondence with the fourth ventilation hole 121. The secondary radiator 1022 can be thermally connected with other component in a circuit board to dissipate heat of the other components in the circuit board in time, so as to keep components in the circuit board in a better temperature range and avoid overheating damage. The first fixing plate 1023 extends along the first direction, and the main radiator 1021 is connected to the first housing 10 through the first fixing plate 1023. The second fixing plate 1024 extends along a vertical direction of the first direction, and the secondary radiator 1022, the second fixing plate 1024 and the main radiator 1021 are fixedly connected in turn along the first direction. The secondary radiator 1022 can be reliably fixed with the main radiator 1021 through the second fixing plate 1024, and then by the first fixing plate 1023, the main radiator 1021 and the secondary radiator 1022 can be jointly and stably fixed on the first housing 10 to realize reliable fixing of the radiator module 102.

Exemplarily, the first housing 10 is provided with a fixing plate part 13 extending along the first direction, and the first fixing plate 1023 can be fixed along a vertical direction of the first direction to butt with the fixing plate 13. Exemplarily, a number of first fixing plates 1023 and that of fixing plates 13 can both be two. Two first fixing plates 1023 and two fixing plates 13 are fixedly connected one by one, and the two first fixing plates 1023 and the two fixing plates 13 are symmetrically provided respectively.

Exemplarily, a third fixing plate 1025 is provided around a side of the main radiator 1021 in face to the third housing 40, the fourth fixing part 41 is provided at the third housing 40, and the third fixing plate 1025 and the fourth fixing part 41 are fixedly connected. In this way, the main radiator 1021 can be fixed with the third housing 40, and in addition to be fixed with the first housing 10, so that the main radiator 1021 can be more stably kept in a housing of the lighting lamp 1.

Figure 8:
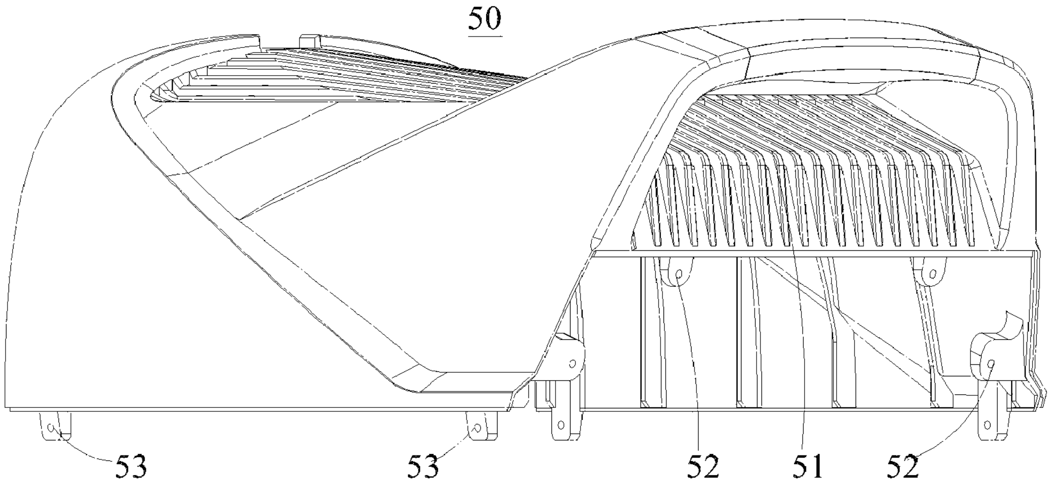
FIG. 8 is an axial structure diagram of a fourth housing for a lighting lamp provided by some embodiments of the present application.

As shown in FIG. 1 and FIG. 8, in some embodiments, the fifth fixing part 215 extending to the fourth housing 50 can be provided on the second housing 20, the sixth fixing part 52 can be provided on the fourth housing 50, and the fifth fixing part 215 and the sixth fixing part 52 can be fixedly connected. In this way, the second housing 20 can be reliably connected with the fourth housing 50, so that the first housing 10, the second housing 20, the third housing 40 and the fourth housing 50 form reliably connected housing structure. Herein, the sixth fixing part 52 can be provided on a side of the fourth housing 50 in face to the second housing 20. Exemplarily, the sixth fixation 52 can be a connecting ear of the fourth housing 50 extending outward the second housing 20. For example, the second housing 20 can be provided with a plurality of fifth fixing parts 215, and the fourth housing 50 can be provided with a plurality of sixth fixing parts 52. Therefore, the second housing 20 and the fourth housing 50 can be connected at a plurality of positions to increase connection reliability.

In some embodiments, the fourth housing 50 can also be provided with a seventh fixing part 53 extending towards the first housing 10, and the seventh fixing part 53 can be connected with the fixing part in correspond to the first housing 10, so that the fourth housing 50 can be reliably connected with the first housing 10. For example, the seventh fixation 53 can be a connecting ear extending outward in the fourth housing 50. Exemplarily, the fourth housing 50 can be provided with a plurality of seventh fixing parts 53, so that the first housing 10 and the fourth housing 50 can be connected at a plurality of positions to increase connection reliability.

The lighting lamp provided by the embodiments of the present application are described in detail above. Specific embodiments are used in this document to illustrate principles and embodiments of the present application. Description of above embodiments is only used to help understand a method and an core idea of the present application; at the same time, those skilled in the art can obtain, according to the idea of the present application, variations in specific embodiments and scope of application, and thus, content of the present specification should not be construed as limitation to the present application.

What is claimed is:

1. A lighting lamp, comprising:

a first housing, extending in a first direction and provided with a first fixing part, wherein, the first fixing part extends along the first direction;

a second housing, provided at an end of the first housing along the first direction, wherein, the second housing is provided with a second fixing part, and the second fixing part extends along a thickness direction of the second housing;

at least one connecting component, comprising at least one first connecting part provided in contact with the first housing and at least one second connecting part provided in contact with the second housing, wherein, the at least one first connecting part and the first fixing part are fixedly connected, and the at least one second connecting part and the second fixing part are fixedly connected;

a third housing, wherein, the third housing and the second housing are provided at two opposite ends of the first housing along the first direction, and a plane where the third housing is located in is vertical to the first direction; and a fourth housing, wherein, the fourth housing is provided in opposition to and in connection with the first housing, and the fourth housing is connected with the second housing and the third housing;

wherein, the first housing, the second housing, the third housing and the fourth housing encloses to form a hollow cavity.

2. The lighting lamp according to claim 1, wherein, the second housing comprises a body wall, the second fixing part is provided on the body wall, the body wall is provided on an end of the first housing along the first direction, an angle between a thickness direction of the body wall and the first direction is a sharp angle, and the second fixing part extends along the thickness direction of the body wall.

3. The lighting lamp according to claim 1, wherein, the first housing is further provided with a third fixing part, and an angle between an extending direction of the third fixing part and the first direction is greater than 0° and less than 180°; and the at least one connecting component is provided with a third connecting part, and the third connecting part and the third fixing part are fixedly connected.

4. The lighting lamp according to claim 1, wherein, the second housing comprises a body wall, the second fixing part is provided on the body wall, the body wall is provided on an end of the first housing along the first direction, an angle between a thickness direction of the body wall and the first direction is a sharp angle, and the second fixing part extends along the thickness direction of the body wall;

and, the first housing is further provided with a third fixing part, and an angle between an extending direction of the third fixing part and the first direction is greater than 0° and less than 180°; and the at least one connecting component is provided with a third connecting part, and the third connecting part and the third fixing part are fixedly connected.

5. The lighting lamp according to claim 2, wherein, the at least one connecting component comprises a body part and first bending parts integrally connected, and an angle between the body part and each of the first bending parts is greater than 0° and less than 180°; the at least one first connecting part is provided on the body part and extends along a thickness direction of the body part, and the thickness direction of the body part is parallel to the first direction; each of the first bending parts and the body wall are provided in parallel, and the at least one second connecting part is provided on at least one of the first bending parts and extends along a thickness direction of the at least one first bending part; the first bending parts are provided at two opposite ends of the body part along an extending direction of the body part, and each of the first bending parts is provided with the at least one second connecting part.

6. The lighting lamp according to claim 3, wherein, the at least one connecting component comprises a body part and a second bending part integrally connected, and an angle between the body part and the second bending part is greater than 0° and less than 180°; the at least one first connecting part is provided on the body part, and a thickness direction of the body part is parallel to the first direction; and the second bending part is parallel to a plane where the third fixing part is located in, and the third connecting part is provided on the second bending part and extends along a thickness direction of the second bending part.

7. The lighting lamp according to claim 3, wherein, an angle between extending directions of any two of the at least one first connecting part, the at least one second connecting part and the third connecting part is greater than 0° and less than 180°.

8. The lighting lamp according to claim 3, wherein, the first housing comprises a supporting plate and two side housings provided at two opposite ends of the supporting plate, the two side housings butt with the second housing along the first direction, and the two side housings are provided with the first fixing part and the third fixing part; the at least one connecting component is a plurality of connecting components, and each of the two side housings is fixedly connected with the second housing through one of the plurality of connecting components.

9. The lighting lamp according to claim 1, wherein, the at least one first connecting part is one first connecting part, the at least one second connecting part is one second connecting part, the one first connecting part and the one second connecting part are provided in pairs and adjacent to each other.

10. The lighting lamp according to claim 1, wherein, the at least one first connecting part is a plurality of first connecting parts, the at least one second connecting part is a plurality of second connecting parts, the plurality of first connecting parts are provided at two opposite ends of the connecting component, and the plurality of second connecting parts are respectively provided at two opposite ends of the connecting component.

11. The lighting lamp according to claim 1, wherein, the at least one first connecting part is one first connecting part, the at least one second connecting part is one second connecting part, the one first connecting part and the one second connecting part are provided in pairs and adjacent to each other; and the at least one first connecting part is a plurality of first connecting parts, the at least one second connecting part is a plurality of second connecting parts, the plurality of first connecting parts are provided at two opposite ends of the connecting component, and the plurality of second connecting parts are respectively provided at two opposite ends of the connecting component.

12. The lighting lamp according to claim 1, wherein, the lighting lamp further comprises:

a radiator module, provided in an end of the hollow cavity in close to the second housing; and a light source, provided in an end of the hollow cavity in close to the third housing.

13. The lighting lamp according to claim 12, wherein, the second housing comprises an end housing and an end cover, the end housing respectively butts with the first housing and the fourth housing, the body wall is formed on the end housing, a central area of the body wall is uplifted in a direction closed to the fourth housing to form a uplift part, and a first ventilation hole is provided on a surface of the uplift part in face to the fourth housing; the end cover is provided at a connection of the uplift part and the body wall, and the end cover is provided with a plurality of second ventilation holes; and the second housing is provided with a fifth fixing part extending to the fourth housing, the fourth housing is provided with a sixth fixing part, and the fifth fixing part and the sixth fixing part are fixedly connected; and wherein, the lighting lamp further comprises a cooling fan, the cooling fan is provided in the uplift part, and the uplift part is embedded in the radiator module.

14. The lighting lamp according to claim 12, wherein, the radiator module comprises a main radiator, a secondary radiator, a first fixing plate and a second fixing plate, the first fixing plate extends along the first direction, the main radiator is connected to the first housing through the first fixing plate, the second fixing plate extends along a vertical direction of the first direction, the secondary radiator, and the second fixing plate and the main radiator are fixedly connected in turn along the first direction; and a third fixing plate is provided around a side of the main radiator in face to the third housing, the fourth fixing part is provided at the third housing, and the third fixing plate and the fourth fixing part are fixedly connected.

15. The lighting lamp according to claim 13, wherein, a plurality of third ventilating holes are provided on the fourth housing, the plurality of third ventilating holes are provided along the first direction, the first ventilating hole is provided in face to the third ventilating hole, the second ventilating hole is provided in face to the first ventilating hole, and the second ventilating hole, the first ventilating hole and the third ventilating hole of the fourth housing in close to an end of the second housing are connected; and a side wall of the first housing in face to the fourth housing is provided with a fourth ventilation hole connected to the third ventilation hole, and the fourth ventilation hole is provided in face to the third ventilation hole.

16. The lighting lamp according to claim 13, wherein, an installation groove is provided on a side surface of the radiator module in close to the second housing, the uplift part is embedded in the installation groove, and shapes of the installation groove and the uplift part are matched.

17. The lighting lamp according to claim 12, wherein, a plurality of cooling fins are provided on a side surface of the radiator module in close to the second housing.

18. The lighting lamp according to claim 13, wherein, the end cover and the uplift part enclose to form an installation space in order to accommodate the cooling fan.

19. The lighting lamp according to claim 14, wherein, the first housing is provided with a fixing plate part extending along the first direction, and the first fixing plate is fixed along a vertical direction of the first direction to butt with the fixing plate.

20. The lighting lamp according to claim 15, wherein, the radiator module comprises a main radiator, and the main radiator comprises a fan provided at a position of the first housing in correspondence with the fourth ventilation hole.

* * * * *